March 29, 1938.　　　S. D. WILEY　　　2,112,614
FLARE
Filed March 12, 1937　　　2 Sheets-Sheet 1
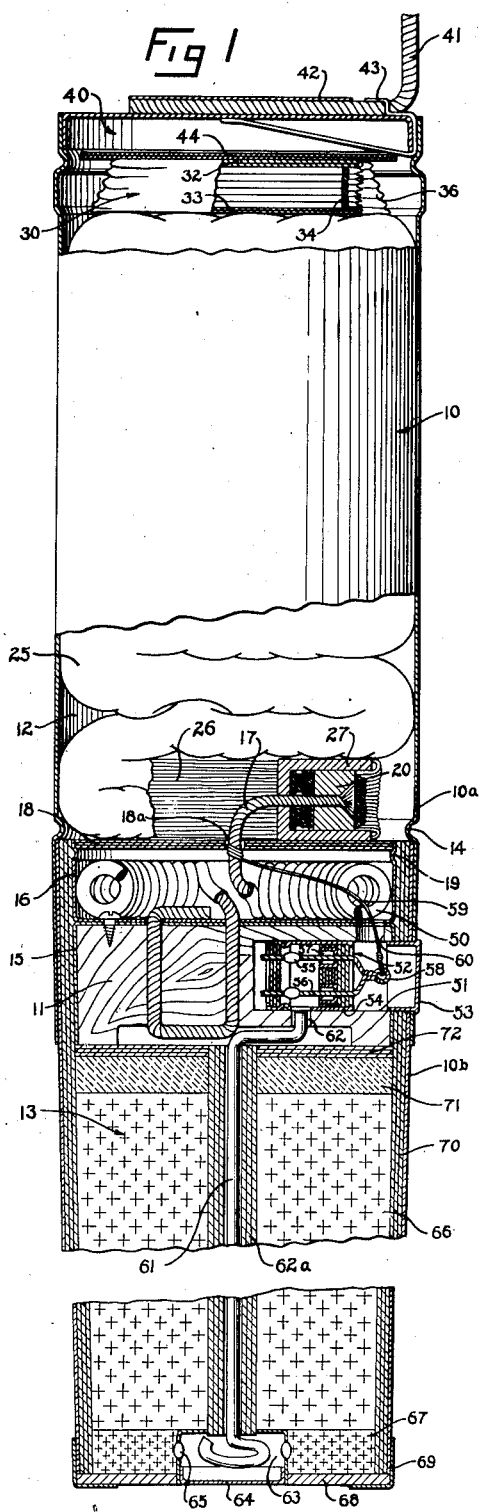
INVENTOR.
Samuel D. Wiley
BY F. Bascom Smith
ATTORNEY.

March 29, 1938. S. D. WILEY 2,112,614
FLARE
Filed March 12, 1937 2 Sheets-Sheet 2
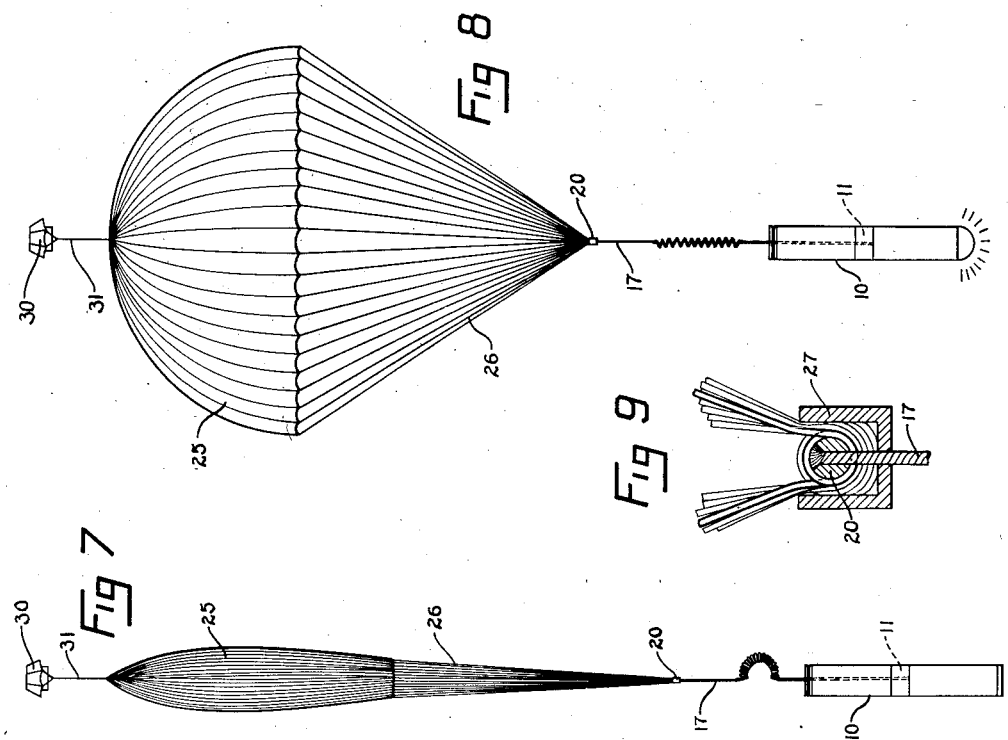
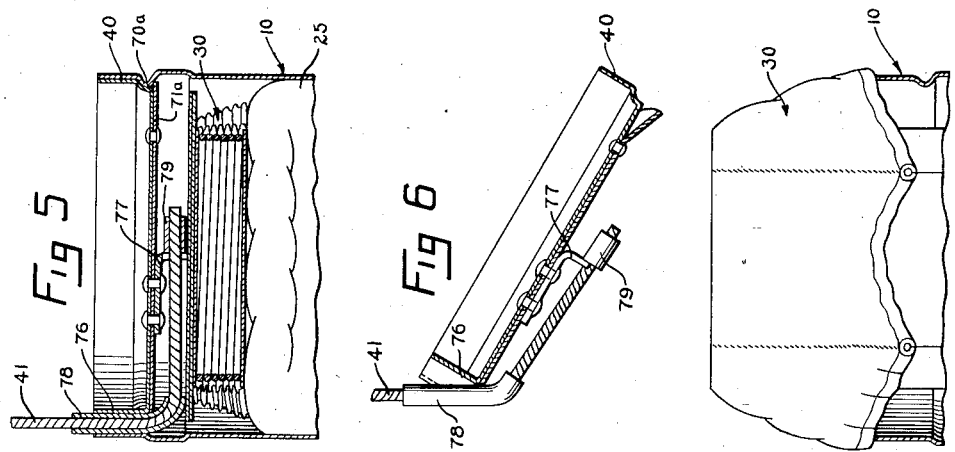
INVENTOR.
Samuel D. Wiley
F. Bascom Smith
BY ATTORNEY.

Patented Mar. 29, 1938

2,112,614

UNITED STATES PATENT OFFICE 2,112,614

FLARE

Samuel D. Wiley, Metuchen, N. J.

Application March 12, 1937, Serial No. 130,485

8 Claims. (Cl. 102—24)

This invention relates to parachute flares and more particularly to an emergency landing flare or the like for use with high speed planes.

An object of the invention is to provide a novel and improved parachute flare of the above type which is adapted for use with all types of aircraft, but is particularly adapted for use with high speed aeroplanes.

Another object is to provide efficient and improved means for releasing the parachute from the container.

Another object is to provide a strong and efficient shock absorbing device to take up the shock when the parachute suddenly opens with the container moving at high speed.

Another object is to provide a parachute flare in which the igniter is easily accessible for inspection or replacement.

Various other objects and advantages will be apparent as the nature of the invention is more fully disclosed.

Although the novel features which are believed to be characteristic of this invention will be more particularly pointed out in the claims appended hereto, the invention will be better understood by referring to the following description, taken in connection with the accompanying drawings, in which certain embodiments thereof have been set forth for purposes of illustration.

Referring to the drawings:

Fig. 1 is a broken side elevation, partly in section, showing a parachute flare embodying the present invention;

Fig. 2 is a detail view showing the top cap removed from the container to release the parachute and showing the parachute drag being ejected;

Fig. 3 is a side elevation of the parachute drag in extended position;

Fig. 4 is a detail view showing the construction of the shock absorbing device;

Fig. 5 is a vertical section through a portion of the top of the container, showing a further embodiment of the invention;

Fig. 6 is a detail view further illustrating the operation of this embodiment;

Fig. 7 is a side elevation showing the parachute withdrawn from the container and ready to open;

Fig. 8 is a similar side elevation showing the parachute open and the shock absorbing device under tension; and, Fig. 9 is a detail view showing the device for attaching the shroud lines to the suspension cable.

Referring to the drawings more in detail, the invention is shown as embodied in a parachute flare comprising a container 10 having a suspension block 11 secured therein to divide the container into a parachute compartment 12 and an illuminant compartment 13. In the form shown, the container is cylindrical. It may, however, be made in other forms as desired. A square or rectangular section may be preferred in some instances to provide more convenient space for packing the parachute.

The container is made in two parts, 10a and 10b, which are permanently joined, with the part 10b seated within the part 10a against a shoulder 14 formed therein. The overlapping parts may be secured by screws or by other suitable means (not shown) to the block 11. The container may, of course, be made in one piece if desired. The lower part 10b of the container is preferably tapered inwardly toward the bottom so as to prevent the illuminant, to be described, from being thrown out by the shock produced when the parachute opens after the flare is dropped from a high speed plane.

The block 11 is provided with a metal cap 15 extending over the top and sides thereof for strengthening purposes, and carries an open cup 16 in which a suspension cable 17 and a shock absorbing device, to be described hereinafter, are coiled. One end of the cable 17 passes through and is secured to the block 11. The other end is fixed in a shroud block 20. In the form shown, the end of the cable 17 is expanded in the cylindrical block 20 (Fig. 9), although it may be secured in other ways. The cup 16 may be closed by a disk 18 of easily removable and light material, such as cardboard, which seats against a circular indentation 19 formed near the rim of said cup. The disk 18 forms a closure for the cup 16 and also forms the bottom of the parachute compartment 12. The suspension cable 17 passes through a central hole 18a in said disk into the parachute compartment.

A parachute 25 is folded and packed in the parachute compartment 12 in the usual manner. This parachute is provided with shroud lines 26 which are looped around the shroud block 20. The shroud lines are preferably attached at both ends to the parachute and are so made that the center portion thereof is wound around the shroud block 20, as shown in Fig. 9. In this way, any sharp edges or knots which would tend to place excessive strains upon the shroud lines are avoided. A cup 21 is positioned over the shroud block 20 and around the loops of the shroud lines 26 so as to securely hold the parts in position.

A parachute drag 30 is provided for pulling the parachute 25 from the container 10. This parachute drag 30 is attached to the top of the parachute 25 by a line 31 (Figs. 7 and 8) and in the form shown comprises a top plate 32 and a bottom plate 33, between which a coiled spring 34 is seated. The plates 32 and 33 may be joined by a collapsible cylindrical cover 35 of suitable material, such as fabric, which is adapted to permit the spring 34 to be compressed, but limits the expansion of said spring and assumes a cylindrical form when the parachute drag 30 is released. An outer member 36 of umbrella shape is attached to the top plate 32 and is secured at spaced points along its bottom edge to the bottom plate 33, as by lines 37, so that the outer cover 36 forms air pockets which, when expanded, exert a drag on the parachute 25 sufficient to pull the same from the container 10.

The drag 30 is packed in the container 10 above the parachute 25 with the spring 34 held collapsed by a top cap 40 which closes the end of the container. The drag is arranged so that when the top cap 40 is removed, in a manner to be described hereinafter, the spring 34 expands to eject the drag, as shown in Fig. 2.

The top cap 40 is releasably attached to a pull-off cable 41 which is adapted to be secured to the plane or other craft from which the device is to be dropped. In the embodiment shown in Figs. 1 and 2, the pull-off cable 41 is attached to the top cap 40 by means of a tubular member 42 which is carried by the top cap and in which the cable 41 is slidable. A U-shaped clip 43 is securely attached to the cable 41 and extends around the edge of and within the cap 40.

The clip 43 engages a disk 44 which rests upon the top plate 32 of the drag 30 to hold the spring 34 collapsed and to press the clip 43 against the inner surface of the cap. The arrangement is such that the clip 43 firmly secures the pull-off cable 41 to slide out of the tubular member 42. The cap thereupon falls to the ground, clear of the flare, and is thus prevented from swinging against the under carriage of the plane.

For absorbing a part of the shock when the parachute 25 opens with the container moving at high speed, a shock absorbing device is provided which, in the form shown, comprises a tube 50 (Fig. 4) of bendable metal, such as copper, through which the suspension cable 17 passes. This tube 50 is coiled helically and is held within the cup 16, above described. The tube 50 may be annealed and is adapted to resist straightening out due to the pull of the suspension cable 17. In certain instances, the different parts of the tube 50 may be differently annealed, the portion nearer the parachute being annealed softer, for example, than the portion nearer the suspension block 11 so that the coiled tube is gradually straightened from one end to the other so as to take up the shock of the opening parachute. In some instances, it may be desirable to anneal the center portion of the tube less than the end portions so that the straightening of the tube begins at both ends.

While a copper tube has been found to be suitable for the above purpose, it is to be understood that the tube may be made of other metals which are adapted to oppose the pull of the cable for the purpose above mentioned. In some instances, a metal band or wire wound helically around the cable may be used in place of a tube. It will also be understood that the novel shock absorbing means disclosed herein is not limited in its use to parachute flares, since the same may be used for other types of parachutes, or where a member is desired which is capable of yieldingly resisting high tension forces.

The suspension block 11 is provided with a radial bore 51 in which an igniter 52 is positioned. This bore is closed by a cap 53 which is adapted for ready removal to facilitate inspection or replacement of the igniter 52.

In the form shown, the igniter 52 comprises a tubular member 54 in which a pair of strikers 55 are mounted on slidable members 56 in position to strike cups 57 when the members 56 are pulled outwardly. The cups 57 are supported in the tubular member 54 by disks 58 through which the slidable members 56 extend. The slidable members 56 are attached to a suitable cord or wire 59 which extends through an aperture 60 in the block 11 and is attached to the suspension cable 17 just above the shock absorbing tube 50 so that the members 56 are pulled when the jerk of the opening parachute takes up the slack in said cord. The members 56 are preferably made of a comparatively flexible material so that they can be readily pulled outwardly by the upward pull of the cord 59 exerted through said aperture 60. The strikers 55 and the cups 57 are made of the usual ignition materials.

A fuse 61 is disposed with one end extending through an aperture 62 in the block 11 in a position to be ignited from the flame produced by the strikers 55. This fuse extends downwardly through a tube 62a which is disposed centrally in the illuminant compartment 13 to a priming cup 63 having a cap 64 and containing igniters 65. A suitable illuminant composition 66 is packed within the illuminant compartment 13 around the insulating tube 62a. Below this illuminant composition 66 a priming composition 67 is provided which is packed around the priming cup 63 and is adapted to be ignited by the igniters 65. The lower end of the illuminant compartment 13 is sealed by a layer of fusible metal 68 which may be held in position by an annular flange 69 attached to the sides of the container 10. A suitable lining of material 70, such as layers of paper or other combustible material, may be disposed between the illuminant composition 66 and the walls of the container 10. The upper end of the illuminant compartment may be sealed by a layer of fire clay 71 and by layers 72 of insulating material.

When the above-described parachute flare is to be dropped from an aircraft, the end of the pull-off cable 41 is attached to the craft and, when the flare is dropped, the tension on cable 41 is effective to pull off the top cap 40 as illustrated in Fig. 2, thereby permitting spring 34 to eject the parachute drag 30 from the container 10. The drag thereupon pulls out the parachute 25, the shroud lines 26 and the suspension cable 17.

The shock of the opening of the parachute is taken up by the coiled tube 50 as it is gradually straightened out by the pull of the suspension cable 17. The tube 50 is preferably designed to resist straightening out, but not to have any appreciable resilience, as no spring action is required after the shock due to the sudden opening of the parachute has been taken up. It is to be understood that the tube 50 may not be entirely straightened but may take an expanded form as shown in Fig. 8, or it may spring back to this form after the shock has been taken up.

When tube 50 has begun to straighten out, a pull is exerted on the cord 59 which actuates the ignition device 52 to ignite the fuse 61. When the flame reaches the end of the fuse 61 in the priming cup 63, the igniters 65 are ignited, the cap 64 is blown off, and the priming composition 67 is ignited. The heat from this composition melts the fusible metal 68 and ignites the illuminant composition 66.

After the top cap 40 has been pulled off of the container 10 by the pull-off cable 41, the clip 43 is freed from cap 40 and the latter slides off of the end of the cable. The cap thus falls to the ground and is thereby prevented from damaging the undercarriage of the plane due to the swinging of the cable 41. Furthermore, since the top cap 40 is entirely removed from the container, it is prevented from interfering in any way with the operation of the parachute drag.

This construction is particularly adapted to use with high speed planes and is designed so that the sudden shock is reduced to a minimum. The pull-off cable 41 is only used to pull off the top cap 40. The drag 30 thereupon pulls the parachute 25 from the container without imposing an undue strain thereon. When the parachute fills out, the shock of stopping the container is reduced to a minimum by the shock absorbing device above described.

It will be noted that the use of a coiled metal tube around the suspension cable serves to strengthen the suspension cable as well as to introduce the necessary shock absorbing properties.

The mounting of the igniter 52 in the suspension block 11 in a position so that it is accessible from the side of the container permits the igniter to be readily removed for inspection or replacement. For this purpose the cap 53 is first removed and a suitable tool is inserted to withdraw the tubular member 54 which carries the igniter mechanism.

In the embodiment shown in Figs. 5 and 6, the container 10 is provided with a plurality of peripheral indentations 70a which are spaced about the periphery thereof. The top cap 40 carries a disc 71a, which is provided with similar indentations, not shown, to permit the cap to be inserted into the container. After the cap is inserted, it is turned slightly so that the peripheral edge of the disc 71a engages beneath the indentations 70a to securely hold the cap in place.

The pull-off cable 41 extends below the top cap 40 through a recess 76 in said cap and engages a forked member 77 which is attached to the lower side of the cap. The cable 41 extends through a flexible sleeve 78 which is disposed in the recess 76 to prevent chafing of the cable and insure a weather-proof closure. Cable 41 carries a fixed collar 79 which rests against the forked member 77 to hold the cable in place.

In this embodiment the cap is securely held in the container by the disc 71a engaging the indentations 70a in the manner above mentioned and the cable 41 is secured to the top cap 40 by means of the forked member 77 and collar 79. When the cable 41 is pulled tight by the falling container it exerts a force sufficient to forcibly pull the top cap 40 from the container; the edges of the disc 71a being bent by the indentations 70a as shown in Fig. 6 as the top cap is removed. When the top cap is free from the container, the collar 79 is quickly disengaged from fork 77, thereby releasing the top cap and permitting the same to fall to the ground. The construction and operation of the device is otherwise similar to that described in connection with Figs. 1 to 4.

The above-described construction provides a parachute flare which is efficient in operation and which is particularly adapted for use with high speed planes. While it is intended primarily as a landing flare, it is obvious that it may be used for other purposes.

Although certain specific embodiments of the invention have been shown for purposes of illustration, it is to be understood that the invention is not limited thereto but that various changes and modifications may be made therein as will be apparent to a person skilled in the art. The invention is only to be limited in accordance with the following claims when interpreted in view of the prior art.

What is claimed is:

1. A parachute flare comprising a container, a parachute and flare mechanism therein, means tending to release said parachute from said container, a cap closing said container and holding said means inoperative, a cable adapted to remove said cap from said container, said cable extending beneath said cap and being independently mounted relative to said parachute, and a forked member carried by said cap and engaging said cable to securely clamp the same when the cap is in position in said container, said forked member being adapted to release said cap from said cable after the cap has been removed from said container.

2. A parachute flare comprising a container having a parachute compartment at its upper end and a compartment for an illuminant composition in its lower end, the lower end of said container being smoothly tapered inwardly to prevent the illuminant composition from being expelled by the shock caused by the opening parachute.

3. A parachute flare comprising a container having flare mechanism therein, a parachute having a flexible suspension cable connected to support said container, and a bendable tubular member surrounding a portion of said cable and coiled into the form of a helix, said member being adapted to resist the straightening of said coil when tension is applied to the cable due to the opening of the parachute.

4. A parachute flare comprising a container having flare mechanism therein, a parachute having a flexible suspension cable connected to support said container, and a metallic tubular member surrounding a portion of said cable and coiled into the form of a helix, said member being adapted to resist the straightening of said coil when tension is applied to the cable due to the opening of the parachute.

5. A parachute flare comprising a container having flare mechanism therein, a parachute having a suspension cable connected to support said container, and a metallic tubular member surrounding a portion of said cable and coiled into the form of a helix, said member being adapted to resist the straightening of said coil when tension is applied to the cable due to the opening of the parachute, the different portions of said tubular member being differently annealed so that it is progressively straightened by the pull of the cable when the parachute opens.

6. A shock absorbing device comprising a flexible cable, and a metallic member surrounding a portion of said cable and holding the same in the form of a helix, said member being adapted to resist the straightening of said coil when tension is applied to said cable.

7. A parachute flare comprising a container, flare mechanism therein including illuminant material, a suspension block in said container, a unitary igniter removably mounted in said block, means carried by the container for preventing removal of the igniter, and a parachute connected to said block to support said container, said igniter being accessible from the side of said container for inspection or renewal without disassembling the flare.

8. A parachute flare comprising a container, flare mechanism therein including illuminant material and a parachute, a suspension block in said container for operatively connecting said parachute to said illuminant material, an igniter horizontally and slidably mounted in said suspension block, and removable means for normally retaining said igniter in operative position.

SAMUEL D. WILEY.